(12) United States Patent
Ogawa

(10) Patent No.: US 7,980,705 B2
(45) Date of Patent: Jul. 19, 2011

(54) COLOR WHEEL HAVING A PLURALITY OF SEGMENTS AND PROJECTOR EMPLOYING THE SAME

(75) Inventor: Masahiro Ogawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 196 days.

(21) Appl. No.: 12/410,606

(22) Filed: Mar. 25, 2009

(65) Prior Publication Data

US 2009/0244495 A1   Oct. 1, 2009

(30) Foreign Application Priority Data

Mar. 26, 2008   (JP) ................ 2008-081348

(51) Int. Cl.
*G03B 21/14* (2006.01)
*G02B 5/22* (2006.01)
*H04N 9/12* (2006.01)
*H04N 5/72* (2006.01)

(52) U.S. Cl. ............ 353/84; 353/20; 359/891; 348/743; 348/835

(58) Field of Classification Search .................. 353/84, 353/20; 359/885, 483, 891, 502; 348/743, 348/835
See application file for complete search history.

(56) References Cited

U.S. PATENT DOCUMENTS

| 5,371,543 A * | 12/1994 | Anderson .................. 348/270 |
| 6,876,505 B2 | 4/2005 | Niwa |
| 2005/0212980 A1 | 9/2005 | Miyazaki |
| 2006/0227300 A1 | 10/2006 | Drazic et al. |

FOREIGN PATENT DOCUMENTS

| CN | 1837893 A | 9/2006 |
| EP | 1 705 511 A1 | 9/2006 |
| JP | 07-184215 A | 7/1995 |
| JP | 2000338426 A  * | 12/2000 |
| JP | 2002-341133 A | 11/2002 |
| JP | 2003-307609 A | 10/2003 |
| JP | 2004-279900 A | 10/2004 |
| JP | 2004-361833 A | 12/2004 |

(Continued)

OTHER PUBLICATIONS

Chinese Office Action dated Sep. 15, 2010 (and English translation thereof) in counterpart Chinese Application No. 200910130617.4.

(Continued)

*Primary Examiner* — Georgia Y Epps
*Assistant Examiner* — Magda Cruz
(74) *Attorney, Agent, or Firm* — Holtz, Holtz, Goodman & Chick, PC

(57) ABSTRACT

A projector includes a light source unit for emitting white light, a color wheel, a display device, a cooling fan, a light source side optical system for guiding light from the light source unit to the display device, a projection side optical system for projecting an image emitted from the display device onto a screen and a projector control unit for controlling the light source and the display device, wherein the color wheel has a plurality of segment areas, and on each segment area, a coating which transmits light of a wavelength band of a complementary color is applied to one side, while a coating which transmits light of a wavelength band of a primary color is applied to part of the other side.

6 Claims, 9 Drawing Sheets

FOREIGN PATENT DOCUMENTS

| | | |
|---|---|---|
| JP | 2005-274656 A | 10/2005 |
| JP | 2006-162658 A | 6/2006 |
| JP | 2006-268042 A | 10/2006 |
| JP | 2007-052059 A | 3/2007 |

OTHER PUBLICATIONS

Japanese Office Action dated Feb. 25, 2010 and English translation thereof issued in counterpart Application No. 2008-081348.

* cited by examiner

FIG. 7

| FILTER PIECES | COMBINATION EXAMPLE (1) | | TRANSMITTED LIGHT |
|---|---|---|---|
| | DICHROIC COATING | | |
| | INCIDENT SURFACE | EMERGENT SURFACE | |
| FIRST FILTER PIECE | MAGENTA | RED | RED |
| | MAGENTA | CLEAR (REFLECTION PREVENTIVE COATING) | MAGENTA |
| SECOND FILTER PIECE | YELLOW | GREEN | GREEN |
| | YELLOW | CLEAR (REFLECTION PREVENTIVE COATING) | YELLOW |
| THIRD FILTER PIECE | CYAN | BLUE | BLUE |
| | CYAN | CLEAR (REFLECTION PREVENTIVE COATING) | CYAN |

| FILTER PIECES | COMBINATION EXAMPLE (2) | | TRANSMITTED LIGHT |
|---|---|---|---|
| | DICHROIC COATING | | |
| | INCIDENT SURFACE | EMERGENT SURFACE | |
| FIRST FILTER PIECE | MAGENTA | BLUE | BLUE |
| | MAGENTA | CLEAR (REFLECTION PREVENTIVE COATING) | MAGENTA |
| SECOND FILTER PIECE | YELLOW | RED | RED |
| | YELLOW | CLEAR (REFLECTION PREVENTIVE COATING) | YELLOW |
| THIRD FILTER PIECE | CYAN | GREEN | GREEN |
| | CYAN | CLEAR (REFLECTION PREVENTIVE COATING) | CYAN |

| FILTER PIECES | COMBINATION EXAMPLE (3) | | TRANSMITTED LIGHT |
|---|---|---|---|
| | DICHROIC COATING | | |
| | INCIDENT SURFACE | EMERGENT SURFACE | |
| FIRST FILTER PIECE | MAGENTA | YELLOW | RED |
| | MAGENTA | CLEAR (REFLECTION PREVENTIVE COATING) | MAGENTA |
| SECOND FILTER PIECE | YELLOW | CYAN | GREEN |
| | YELLOW | CLEAR (REFLECTION PREVENTIVE COATING) | YELLOW |
| THIRD FILTER PIECE | CYAN | MAGENTA | BLUE |
| | CYAN | CLEAR (REFLECTION PREVENTIVE COATING) | CYAN |

| FILTER PIECES | COMBINATION EXAMPLE (4) | | TRANSMITTED LIGHT |
|---|---|---|---|
| | DICHROIC COATING | | |
| | INCIDENT SURFACE | EMERGENT SURFACE | |
| FIRST FILTER PIECE | MAGENTA | CYAN | BLUE |
| | MAGENTA | CLEAR (REFLECTION PREVENTIVE COATING) | MAGENTA |
| SECOND FILTER PIECE | YELLOW | MAGENTA | RED |
| | YELLOW | CLEAR (REFLECTION PREVENTIVE COATING) | YELLOW |
| THIRD FILTER PIECE | CYAN | YELLOW | GREEN |
| | CYAN | CLEAR (REFLECTION PREVENTIVE COATING) | CYAN |

FIG. 8

| FILTER PIECES | DICHROIC COATING | | TRANSMITTED LIGHT |
| --- | --- | --- | --- |
| | INCIDENT SURFACE | EMERGENT SURFACE | |
| FIRST FILTER PIECE | MAGENTA | RED | RED |
| | MAGENTA | CLEAR (REFLECTION PREVENTIVE COATING) | MAGENTA |
| SECOND FILTER PIECE | YELLOW | GREEN | GREEN |
| | YELLOW | CLEAR (REFLECTION PREVENTIVE COATING) | YELLOW |
| THIRD FILTER PIECE | CYAN | BLUE | BLUE |
| | CYAN | CLEAR (REFLECTION PREVENTIVE COATING) | CYAN |
| | CLEAR (REFLECTION PREVENTIVE COATING) | CLEAR (REFLECTION PREVENTIVE COATING) | CLEAR (WHITE) |

FIG. 9

| FILTER PIECES | DICHROIC COATING | | TRANSMITTED LIGHT |
| --- | --- | --- | --- |
| | INCIDENT SURFACE | EMERGENT SURFACE | |
| FIRST FILTER PIECE | MAGENTA | RED | RED |
| | MAGENTA | CLEAR (REFLECTION PREVENTIVE COATING) | MAGENTA |
| SECOND FILTER PIECE | YELLOW | GREEN | GREEN |
| | YELLOW | CLEAR (REFLECTION PREVENTIVE COATING) | YELLOW |
| THIRD FILTER PIECE | CYAN | BLUE | BLUE |
| | CYAN | CLEAR (REFLECTION PREVENTIVE COATING) | CYAN |
| FOURTH FILTER PIECE | CLEAR (REFLECTION PREVENTIVE COATING) | CLEAR (REFLECTION PREVENTIVE COATING) | CLEAR (WHITE) |

FIG. 10

| FILTER PIECES | DICHROIC COATING | | TRANSMITTED LIGHT |
| --- | --- | --- | --- |
| | INCIDENT SURFACE | EMERGENT SURFACE | |
| FIRST FILTER PIECE | MAGENTA | BLUE | BLUE |
| | MAGENTA | CLEAR (REFLECTION PREVENTIVE COATING) | MAGENTA |
| SECOND FILTER PIECE | YELLOW | RED | RED |
| | YELLOW | CLEAR (REFLECTION PREVENTIVE COATING) | YELLOW |
| THIRD FILTER PIECE | CYAN | GREEN | GREEN |
| | CYAN | CLEAR (REFLECTION PREVENTIVE COATING) | CYAN |
| | CLEAR (REFLECTION PREVENTIVE COATING) | CLEAR (REFLECTION PREVENTIVE COATING) | CLEAR (WHITE) |

FIG. 11

| FILTER PIECES | DICHROIC COATING | | TRANSMITTED LIGHT |
| --- | --- | --- | --- |
| | INCIDENT SURFACE | EMERGENT SURFACE | |
| FIRST FILTER PIECE | MAGENTA | BLUE | BLUE |
| | MAGENTA | CLEAR (REFLECTION PREVENTIVE COATING) | MAGENTA |
| SECOND FILTER PIECE | YELLOW | RED | RED |
| | YELLOW | CLEAR (REFLECTION PREVENTIVE COATING) | YELLOW |
| THIRD FILTER PIECE | CYAN | GREEN | GREEN |
| | CYAN | CLEAR (REFLECTION PREVENTIVE COATING) | CYAN |
| FOURTH FILTER PIECE | CLEAR (REFLECTION PREVENTIVE COATING) | CLEAR (REFLECTION PREVENTIVE COATING) | CLEAR (WHITE) |

COLOR WHEEL HAVING A PLURALITY OF SEGMENTS AND PROJECTOR EMPLOYING THE SAME

CROSS-REFERENCE TO RELATED APPLICATIONS

This application is based upon and claims the benefit of priority under 35 USC 119 of Japanese Patent Application No. 2008-081348 filed on Mar. 26, 2008, the entire disclosure of which, including the description, claims, drawings, and abstract, is incorporated herein by reference.

BACKGROUND OF THE INVENTION

1. Field of the Invention

The present invention relates to a color wheel and a projector which incorporates the color wheel.

2. Description of the Related Art

In these days, projectors are used in many cases as an image projection apparatus for projecting screens and video images of a personal computer and, further, images based on image data stored in a memory card on to a screen.

According to the configuration of these projectors, a light source unit including a small high-luminance metal halide lamp or a high-pressure mercury lamp is incorporated and light emitted from the light source is passed through a color wheel of a color wheel unit for coloring. The light so colored is then passed through a light guide rod or light smoothing rod and is, thereafter, concentrated on to digital micromirror devices referred to as DMDs via lenses and mirrors, so that a color image is displayed on to a screen by the amount of light reflected by the micromirrors in the on position towards a projection opening of the projector via a projection lens.

The color wheel unit of the projectors is made up of a color wheel having red, green and blue filters and a wheel motor for rotating the color wheel at a rotational speed of about 120 revolutions per second.

Incidentally, this color wheel is made up of a plurality of filter pieces and is generally formed into a three-segment color wheel including segments of red, green and blue, which are "primary colors". However, in order to prevent color separation by a rainbow effect, there sometimes occur cases where six-segment three-color color wheel is used which includes red, blue, green, red, blue and green segments.

In addition, in order to realize an increase in color reproduction characteristics by increasing the luminance, there are cases from time to time where a color wheel is used which has one or more segments added to the three-segment color wheels. This color wheel having four or more segments includes a colorless filter piece and/or filter pieces for magenta, yellow and cyan which configure complementary colors.

In addition, for example, Japanese Unexamined Patent Publication No. 2007-52059 proposes a projector which includes a color time division unit for dividing white light into light beams of three primary colors, red, green and blue, in a time division manner, DMDs for sequentially modulating the light beams of three primary colors which have been so divided in the time division manner by the color time division unit, and a projection lens for projecting the light beams which have been modulated by the DMDs in combination with one another. In this projector, as the color time division unit, there are provided a color wheel in which filter pieces of magenta, yellow and cyan, which configure complementary colors, are disposed in a circumferential direction in such a manner as to divide the color wheel into three equal segments and a reflection mirror for reflecting the light beams which result when the white light from a white light source passes through the two filter pieces of the color wheel in such a way as to be returned to the color wheel for re-passage. In addition, the reflection mirror is provided in such a manner that two light incident points, an incident point of light from the white light source and an incident point of light from the reflection mirror, lie in an axial symmetry with respect to a rotational axis of the color wheel.

In the related art techniques, however, in the event that the number of colors of a color wheel is increased, since it is general practice to apply a coating which transmits only light of certain wavelengths to each of filter pieces of the color wheel, there has been caused a problem that the number of components is increased. In addition, since a color wheel unit is formed by disposing the respective filter pieces about a rotational shaft of a wheel motor in such a way as to form a disk and then, fixing the filter pieces so disposed to the rotational shaft of the wheel motor with an adhesive or different fixing means, in the event that the number of filter pieces is increased, the position of the respective filter pieces becomes complex, and this causes a problem that an increase in the number of manhours and hence an increase in production costs are called for. Further, there is also caused a problem that it becomes difficult to fix the filter pieces so strong and rigid to the rotational shaft of the wheel motor as to withstand high-speed rotations from the viewpoint of strength.

In addition, in the invention proposed in the aforesaid patent document, the color wheel is provided in which the filter pieces which transmit the light beams of complementary colors to the three primary colors of light are arranged in the circumferential direction, and the reflection mirror is disposed which returns the light beam that has passed through the one filter piece in such a manner as to cause the light beam to pass through the different filter again. By adopting this configuration, the dividing speed of color in the time division manner can be made twice faster without increasing the rotational speed of the color wheel and the number of filter pieces and the color separation due to the rainbow effect can be prevented. However, there needs to provide the reflection mirror for reflecting the light beam that has passed through the filter piece, and this has called for a problem that the configuration in which the optical system including the reflection mirror is arranged becomes complex. In addition, since the light beams of magenta, yellow and cyan, which configure the complementary colors, cannot be used as they are when they have passed through the respective filter pieces, there has been caused a problem that the color reproduction characteristics cannot be increased by increasing the luminance.

SUMMARY OF THE INVENTION

The invention has been made with a view to solving the problems inherent in the related art.

According to a preferred embodiment of the invention, there is provided a color wheel having a plurality of segment areas, wherein on each segment area, a coating for transmitting light of a wavelength band of one complementary color is applied to one side and a coating for transmitting light of a wavelength band of one primary color is applied to part of the other side.

In addition, according to another preferred embodiment of the invention, there is provided a projector including a light source unit for emitting white light, a color wheel, a display device, a cooling fan, a light source side optical system for guiding light from the light source unit to the display device, a projection side optical system for projecting an image emitted from the display device on to a screen and a projector control unit for controlling the light source and the display device, wherein the color wheel is the color wheel described in the preferred embodiment above.

Further, according to a further preferred embodiment of the invention, there is provided a color wheel having a plurality of segment areas, wherein on each segment area, a coating for transmitting light of a wavelength band of one complementary color is applied to one side and a coating for transmitting light of a wavelength band of another complementary color is applied to part of the other side.

Furthermore, according to another preferred embodiment of the invention, there is provided a projector including a light source unit for emitting white light, a color wheel, a display device, a cooling fan, a light source side optical system for guiding light from the light source unit to the display device, a projection side optical system for projecting an image emitted from the display device on to a screen and a projector control unit for controlling the light source and the display device, wherein the color wheel is the color wheel described in the further preferred embodiment above.

BRIEF DESCRIPTION OF THE DRAWINGS

FIG. 7 is a diagram showing combination examples of dichroic coatings according to the embodiment of the invention;

FIG. 8 is a diagram showing combination examples of dichroic coatings according to the embodiment of the invention;

FIG. 9 is a diagram showing combination examples of dichroic coatings according to the embodiment of the invention;

FIG. 10 is a diagram showing combination examples of dichroic coatings according to the embodiment of the invention;

FIG. 11 is a diagram showing combination examples of dichroic coatings according to the embodiment of the invention.

DETAILED DESCRIPTION OF THE PREFERRED EMBODIMENT

Figure 1:
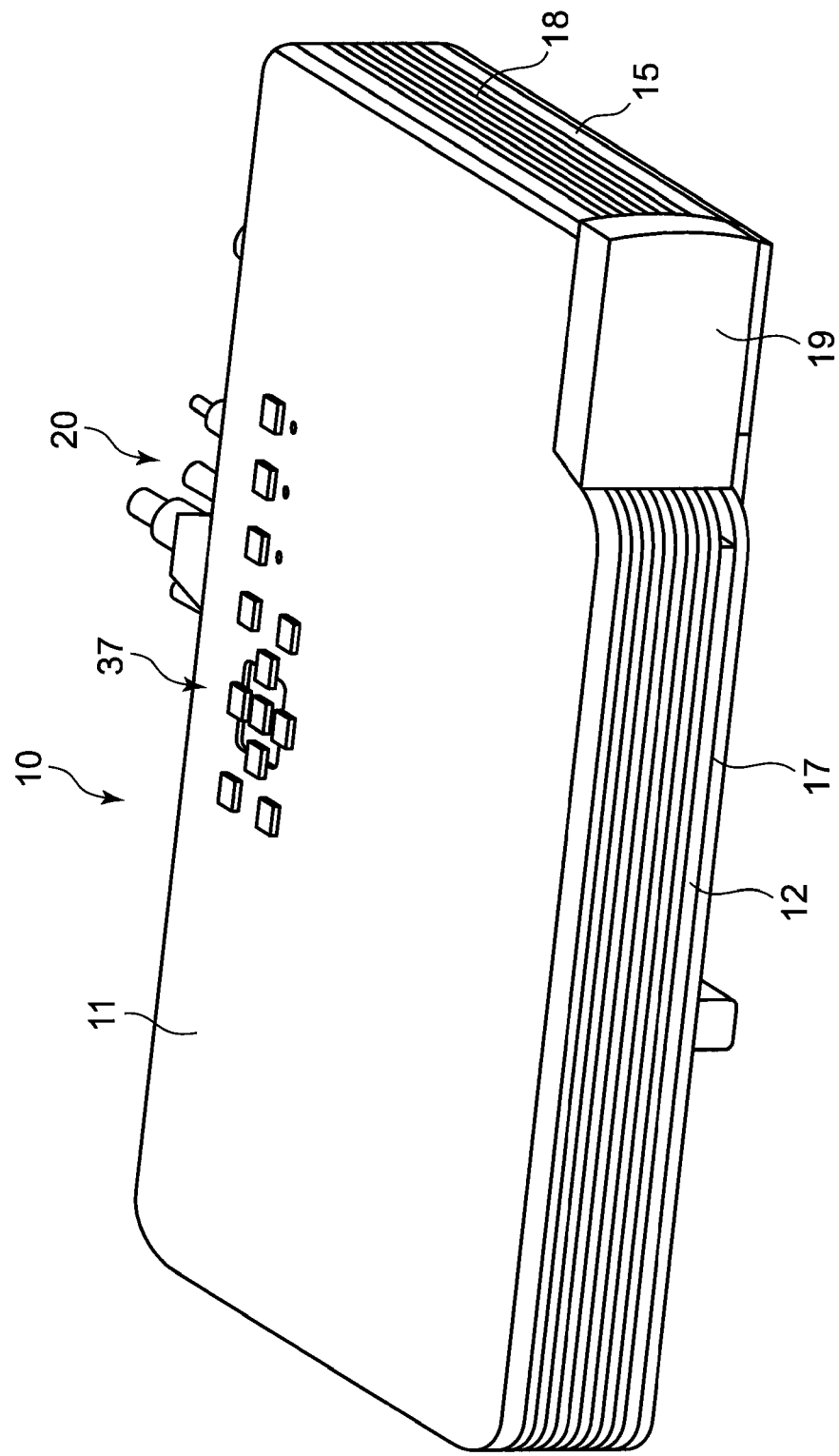
FIG. 1 is a perspective view showing an external appearance of a projector according an embodiment of the invention.

A projector 10 according to a best mode for carrying out the invention includes a light source unit 63 for emitting white light, a color wheel 71, a display device 51, a cooling fan, a light source side optical system 61 for guiding light from the light source unit 63 to the display device 51, a projection side optical system 62 for projecting an image emitted from the display device 51 on to a screen, and a projector control unit for controlling the light source unit 63 and the display device 51.

In addition, this color wheel 71 has a segment area in which a coating for transmitting light of a wavelength band of magenta is applied to one side and a coating for transmitting light of a wavelength band of red is applied to the other side thereof, a segment area in which a coating for transmitting light of a wavelength band of yellow is applied to one side and a coating for transmitting light of a wavelength band of green is applied to the other side thereof, and a segment area in which a coating for transmitting light of a wavelength band of cyan is applied to one side and a coating for transmitting light of a wavelength band of blue is applied to the other side thereof.

Additionally, there may be a case where the color wheel 71 has the three segment areas and at least one of the segment areas has a colorless filter portion in which the coatings for transmitting only the light of specific wavelength bands are not applied to both sides thereof.

Hereinafter, an embodiment of the invention will be described based on the drawings. As is shown in FIG. 1, a projector 10 according to the embodiment of the invention has a substantially rectangular parallelepiped shape, and the projector 10 has a lens cover 19 which is provided to a side of a front plate 12 which is a front side lateral plate of a body casing of the projector 10 for covering a projection opening, a plurality of air outlet slots 17 being provided in the front plate 12.

In addition, the projector 10 has a key/indicator part 37 on an upper plate 11 of the body casing, and this key/indicator part 37 includes keys and indicators including a power supply switch key, a power indicator for informing that the power supply is on or off, an overheat indicator for informing of overheat of the light source unit and the like.

Further, when looking at a back side of the body casing, the projector 10 has on a back plate thereof an input/output connector part where a USB terminal, an image signal inputting D-SUB terminal, an S terminal, an RCA terminal and the like are provided and various terminals 20 including a power supply adapter plug and the like, a memory card slot, not shown, and an Ir reception part for receiving a control signal from a remote controller.

In addition, the projector 10 has a plurality of air inlet slots 18 which are provided in the vicinity of a lower portion of each of the back plate, a right-hand plate, not shown, which is a lateral plate of the body casing and a left-hand plate 15 which is a lateral side plate of the body casing shown in FIG. 1.

Figure 2:
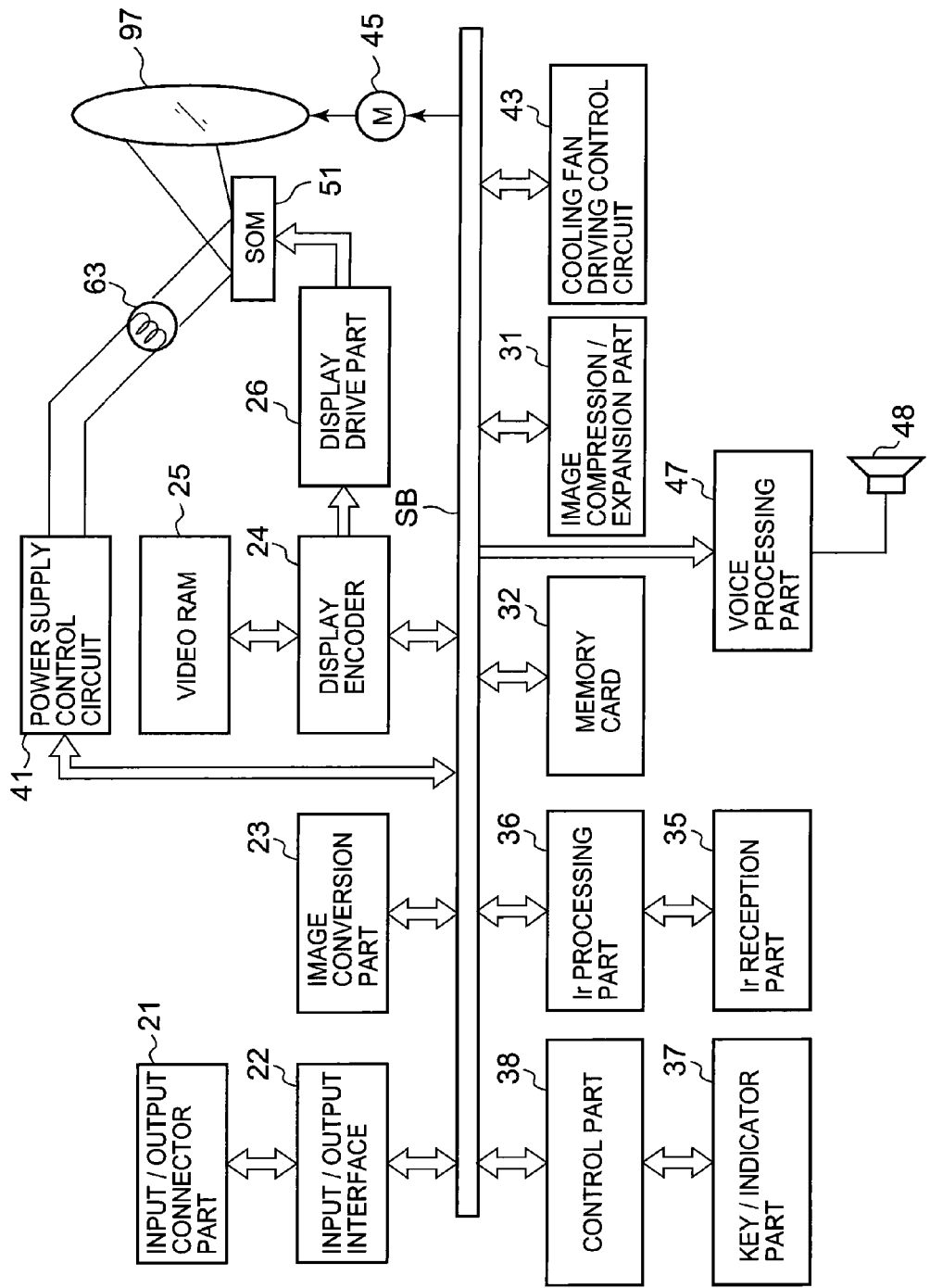
FIG. 2 is a block diagram showing functional circuit blocks of the projector according to the embodiment.

Additionally, as is shown in FIG. 2, the projector control unit of the projector 10 has a control part 38, an input/output interface 22, an image transforming part 23, a display encoder 24, and a display driving part 26. Image signals of various standards which are inputted from the input/output connector part 21 are sent to the image transforming part 23 via the input/output interface 22 and a system bus (SB) where the image signals are converted into a unified image signal in a predetermined format and the unified image signal so converted is then sent to the display encoder 24.

In addition, the display encoder 24 deploys the image signal sent thereto in a video RAM 25 for storage therein and thereafter creates a video signal from the contents stored in the video RAM 25 for output to the display driving part 26.

Then, the display driving part 26, into which video signals are inputted from the display encoder 24, drives the display device 51 which is a spatial optical modulator (SOM) at an appropriate frame rate correspondingly to image signals sent thereto, whereby by causing light from the light source unit 63 to be incident on the display device 51 via an illumination unit for constituting the light source side optical system, an optical image is formed by reflected light from the display device 51, and the optical image so formed is then projected on to a screen, not shown, via a projection unit which constitutes the projection side optical system. A movable lens unit 97 is driven by a lens motor 45 for zooming and focusing.

In addition, an image compression and expansion part 31 performs a recording operation in which a luminance signal and a color difference signal in the image signal are subjected to data compression by ADCT (adaptive discrete cosine transformation) and Huffman coding operations so as to be written sequentially into a memory card 32 which is a detachable recording medium. When in a reproduction mode, the image compression and expansion part 31 reads out image data recorded in the memory card 32 so as to expand individual image data which configure a series of moving pictures recorded in the memory card 32 frame by frame and sends the image data so expanded to the display encoder 24 via the image transforming part 23, so as to enable the display of moving pictures based on the image data stored in the memory cart 32.

Then, the control part 38 governs the control of operations of respective circuits within the projector 10 and is made up of a CPU, a ROM which stored fixedly operation programs such as various types of settings and a RAM which is used as a work memory.

In addition, an operation signal of the key/indicator part 37 which includes main keys and indicators provided on the upper plate 11 of the body casing is sent directly to the control part 38, while a key operation signal from the remote controller is received by the Ir reception part 35, and a code signal demodulated in an Ir processing part 36 is sent to the control part 38.

Note that a sound processing part 47 is connected to the control part 38 via the system bus (SB). The sound processing part 47 includes a sound source circuit such as a PCM sound source and converts sound data into analog signals so as to radiate sound loudly via a speaker 48 which is driven for this purpose when in projection mode and in reproduction mode.

In addition, the control part 38 controls a power supply control circuit 41, and when the power supply switch key is operated, the power supply control circuit 41 illuminates a discharge lamp of the light source unit 63. Further, the control part 38 also controls a cooling fan drive control circuit 43, and this cooling fan drive control circuit 43 causes a plurality of temperature sensors provided on the light source unit 63 and the like to detect temperatures in locations where they are provided for control of the rotational speed of the cooling fan. The cooling fan drive control circuit 43 also causes the cooling fan to continue rotating by the use of a timer even after the lamp of the light source unit 63 has been turned off. Further, depending upon the results of temperature detections by the temperature sensors, the cooling fan drive control circuit 43 controls the light source unit 63 to stop to thereby switch off the power supply of the projector main body.

Figure 3:
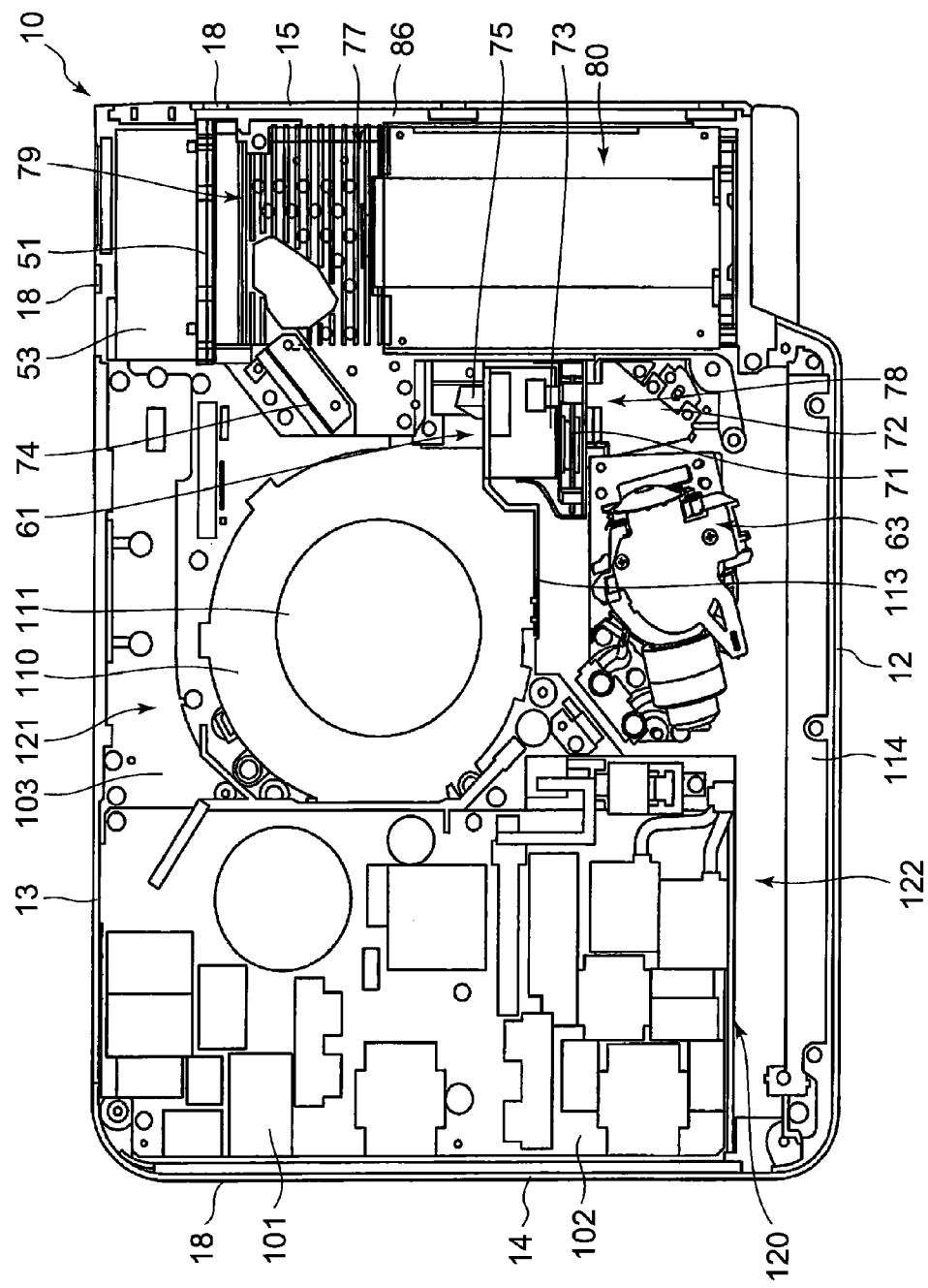
FIG. 3 is a plan view of the projector according to the embodiment of the invention with an upper plate thereof removed.

In addition, as is shown in FIG. 3, the projector 10 has an interior construction in which a power supply control circuit board 102 on which a lamp power supply circuit block 101 is mounted is disposed in the vicinity of the right-hand plate 14, an interior of a projector housing is partitioned airtightly into an air inlet side space compartment 121 lying on the back plate 13 side and an air outlet side space compartment 122 lying on the front plate 12 side by a partition bulkhead 120, a sirocco fan type blower 110 is disposed as a cooling fan in the vicinity of the center of the projector 10, and an inlet port 111 of the blower 110 is positioned in the air inlet side space compartment 121 and an outlet port 113 of the blower 110 is positioned in the air outlet side space compartment 122.

Further, the light source unit 63 is disposed in the air outlet side space compartment 122, an optical unit block 77 including an illumination side block 78, an image creating block 79 and a projection side block 80 is disposed along the left-hand plate 15, part of the illumination unit which is provided in the illumination side block 78 of the optical unit block 77 in such a manner that the illumination side block 78 is made to open to the air outlet side space compartment 122 for communication is disposed so as to be positioned in the air outlet side space compartment 122, and an outlet air temperature reduction device 114 is disposed along the front plate 12 of the air outlet side space compartment 122.

The light source unit 63 has a reflector which has a reflection coating which configures a reflection surface on an inner surface thereof and an opening at the front thereof and a discharge lamp which employs halogen and which is incorporated in an interior of the reflector.

In addition, the blower 110, which functions as a cooling fan for cooling the light source unit 63, has the inlet port 111 in a central portion and the outlet port 113 which has a substantially square cross section and is connected to the partition bulkhead 120, so that air from the blower 110 is discharged into the air outlet side space compartment 122 which is partitioned by the partition bulkhead 120. A control circuit board 103 is disposed in the vicinity of the inlet port 111 of the blower 110.

The optical unit block 77 is made up of the three blocks including the illumination side block 78 which is disposed in the vicinity of the light source unit 63 and which includes part of the illumination unit for emitting light emitted from the light source unit 63 towards the image creating block 79, the image creating block 79 which includes part of the illumination unit and the display device 51 and which reflects the light emitted from the illumination side block 78 towards the projection side block 80 in accordance with image data, and the projection side block 80 which includes the projection unit, which is disposed in the vicinity of the left-hand plate 15 and which projects the light reflected by the image forming block 79.

Figure 4:
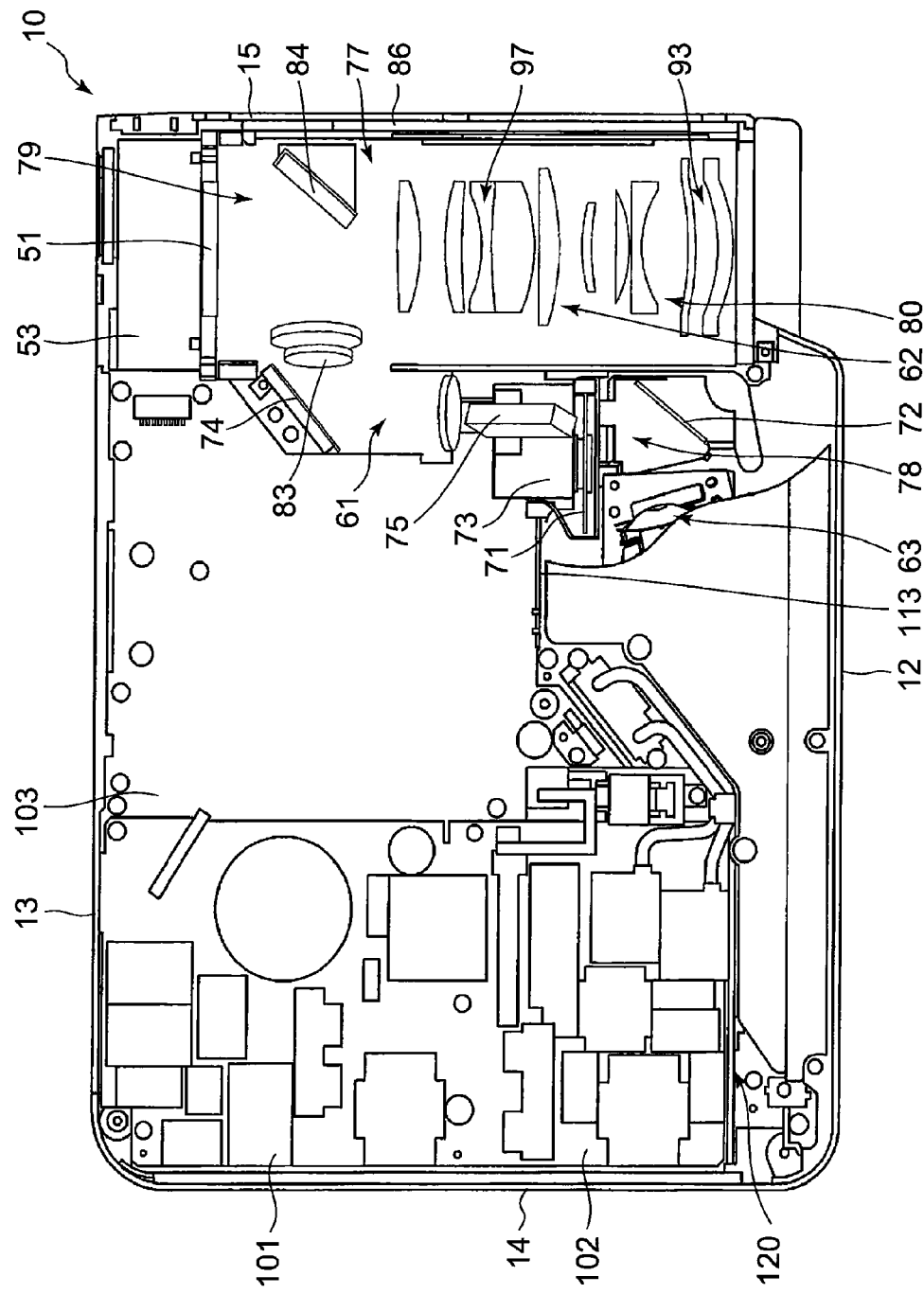
FIG. 4 is a plan view showing an interior of an optical unit block of the projector according to the embodiment of the invention.

As is shown in FIG. 4, part of the illumination unit which forms the light source side optical system 61 included in the illumination side block 78 includes a first reflection mirror 72 for reflecting light emitted from the light source unit 63 towards the color wheel 71, the color wheel unit made up of the color wheel 71 which has filter pieces which are provided on a circumference thereof in such a manner as to be rotated by the wheel motor 73 for transmitting the light from the first reflection mirror 72 as light beams of wavelength bands of red, green and blue and the wheel motor 73, a light guide unit or light smoothing unit 75 for making the light beams that have passed through the filter pieces of the color wheel 71 into light beams whose intensity is uniformly distributed across the width thereof as they travel down this light smoothing unit 75, and the like.

In addition, part of the illumination unit which forms the light source side optical system 61 which is included in the image creating block 79 includes a second reflection mirror 74 for changing the directions of the light beams which have emerged from the light smoothing unit 75, a condensing lens unit 83 for concentrating the light beams reflected by the second reflection mirror 74 on to the display device 51 and an shining mirror 84 for shining the light beams that have passed through the condensing lens unit 83 at a predetermined angle towards the display device 51. In addition, the image creating block 79 also includes the display device 51, and a DMD is adopted as configuring the display device 51. Further, a display device heat dissipating plate 53 is disposed on a back plate 13 side of the display device 51 for cooling the display device 51.

In this DMD, a large number of micromirrors are disposed in a matrix fashion, and light incident thereon from an incident direction which is tilted in one direction relative to a front facing direction is reflected separately as light in an on state where the light is reflected in the front direction and light in an off state where the light is reflected in an oblique direction by causing the micromirrors to tilt to switch between an on position and an off position so as to form an image in one of the primary colors. Specifically, light incident on the micromirror which is tilted in one tilted direction or in the on position is reflected in the front direction or towards the projection lens unit by the micromirror in question as light in the on state, while light incident on the micromirror which is tilted in the other tilted direction or in the off position is reflected in the oblique direction or towards a light absorber plate as light in the off state, whereby the on-state light reflected in the front direction is shone as a bright light beam, while the off-state light reflected in the oblique direction is absorbed by the light absorber plate, producing a dark or black indication, an image thus being created.

In addition, the projection side block 80 includes the projection unit which has a fixed lens unit 93 and a movable lens unit 97 which form the projection side optical system 62 for shining image-forming bright light beams on to the screen, not shown. The projection unit is made into a variable focus lens by the lens units of the projection side optical system 62, in which the movable lens unit 97 is shifted along an optical axis thereof by controlling the lens motor 45 by an optical system control circuit board 86 which is disposed between the optical unit block 77 and the left-hand plate 15 for zooming and focusing.

The color wheel unit constitutes the illumination unit which forms the light source side optical system 61 and is made up of the color wheel 71 and the wheel motor 73, the color wheel 71 being attached to the wheel motor 73 by adhesion or an attaching tool.

Figure 5A:
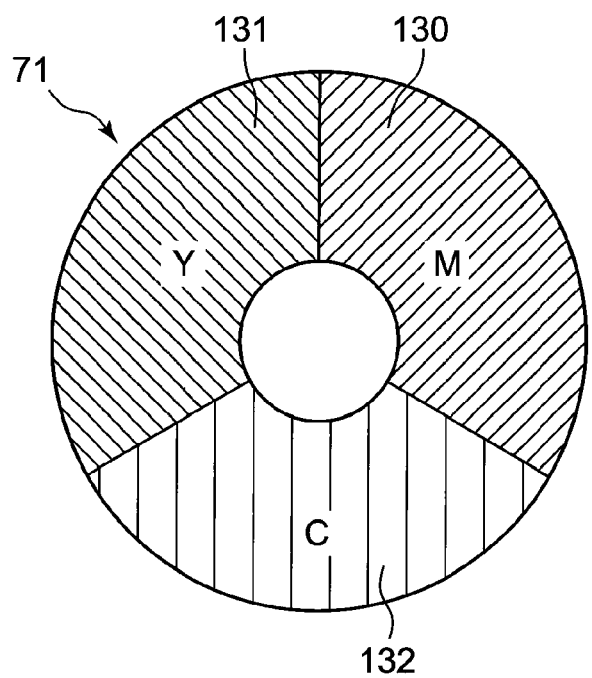
FIG. 5 shows a front view and a back view of a color wheel according to the embodiment of the invention.
Figure 5B:
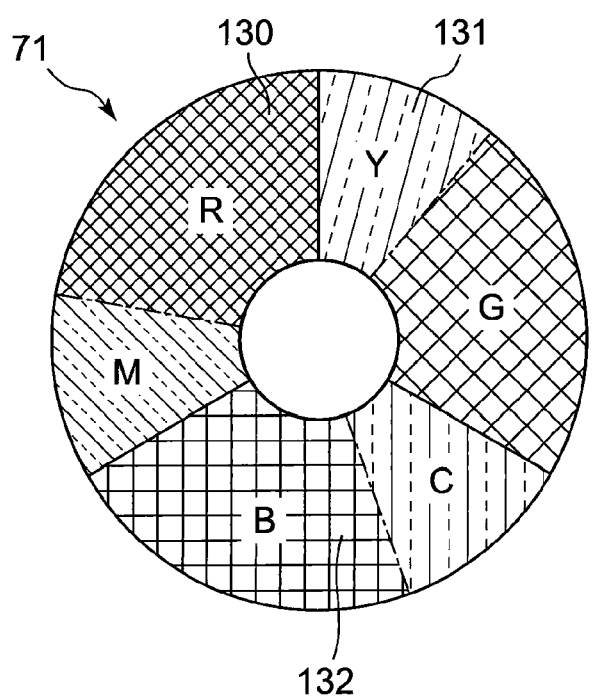

As is shown in FIGS. 5A and 5B, this color wheel 71 is formed into a thin disk on which a plurality of fan-shaped filter pieces, which form segment areas which transmit light of different colors, are provided in such a manner as to be arranged in a circumferential direction, and fan-shaped cut-off portions are formed on central portion sides of the fan-shaped filter pieces in such a manner as to form a cut-off portion or hole which corresponds to the shape of a cylindrical rotational shaft of the wheel motor 73 when they get together so that they can be fixed to the rotational shaft which configures an attaching portion of the wheel motor 73. When the respective fan-shaped filter pieces are placed together to configure the color wheel 71, the cut-off portions form a circular opening whose diameter is substantially the same as the diameter of the rotational shaft of the color wheel 71 which configures the attaching portion thereof. In addition, the color wheel 71 of this embodiment is made up of three first to third filter pieces 130 to 132 so as to form three segment areas.

In addition, as is shown in FIG. 5A which shows light incident surface sides of the first to third filter pieces 130 to 132 on which white light emitted from the light source unit 63 is incident, dichroic coatings which transmit only light of wavelength bands of specific complementary colors are applied to the whole areas of the light incident surfaces of the first to third filter pieces 130 to 132. As is shown in FIG. 5B which shows light emergent surface sides of the filter pieces 130 to 132, dichroic coatings which transmit only light of wavelength bands of primary colors which are included in the wavelength bands of the corresponding complementary colors are applied to portions at one sides or parts of light emergent surface sides of the filter pieces.

In this embodiment, a dichroic coating which transmits only light of a wavelength band corresponding to magenta (M) is applied to the whole of the light incident surface of the first filter piece 130, while a dichroic coating which transmits only light of a wavelength band corresponding to red (R) is applied to a portion at one side or part of the light emergent surface of the first filter piece 130 which occupies about two third of the whole light emergent surface. In addition, a dichroic coating which transmits only light of a wavelength band corresponding to yellow (Y) is applied to the whole of the light incident surface of the second filter piece 131, while a dichroic coating which transmits only light of a wavelength band corresponding to green (G) is applied to a portion at one side or part of the light emergent surface of the second filter piece 131 which occupies about two third of the whole light emergent surface. Further, a dichroic coating which transmits only light of a wavelength band corresponding to cyan (C) is applied to the whole of the light incident surface of the third filter piece 132, while a dichroic coating which transmits only light of a wavelength band corresponding to blue (B) is applied to a portion at one side or part of the light emergent surface of the third filter piece 132 which occupies about two third of the whole light emergent surface. In addition, a reflection preventive coating is applied to each of portions where the dichroic coatings are not applied.

Incidentally, in the color wheel 71 according to the embodiment, each filter piece of the first to third filter pieces 130 to 132 has the portion where the dichroic coating is applied to only the light incident surface and the portion where the dichroic coatings are applied to both the light incident surface and the light emergent surface, and since one filter piece can transmit light of wavelength bands of two colors, the color wheel 71 is made as a color wheel which can transmit light of wavelength bands of six colors in total.

Hereinafter, light which passes through the first to third filter pieces 130 to 132 will be described specifically together with spectral characteristics of wavelengths bands of red, green, blue, magenta, yellow and cyan.

Figure 6A:
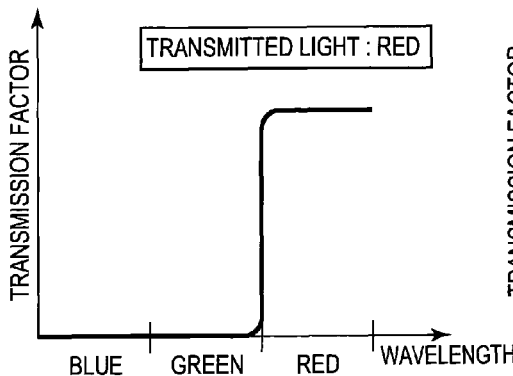
FIG. 6 shows diagrams showing spectral characteristics of transmitted light of the color wheel according to the embodiment of the invention.

With respect to spectral characteristics of the six colors, as is shown in FIG. 6A, a filter to which a dichroic coating which transmits only light of a wavelength band of red is applied transmits light of the red wavelength band and cuts off or reflects light of wavelength bands of blue and green. In addition, as is shown in FIG. 6B, a filter to which a dichroic coating which transmits only light of a wavelength band of green is applied transmits only light of the green wavelength band and cuts off or reflects light of wavelength bands of red and blue. Further, as is shown in FIG. 6C, a filter to which a dichroic coating which transmits only light of a wavelength of blue is applied transmits only light of the blue wavelength band and cuts off or reflects light of wavelength bands of red and green.

Figure 6D:
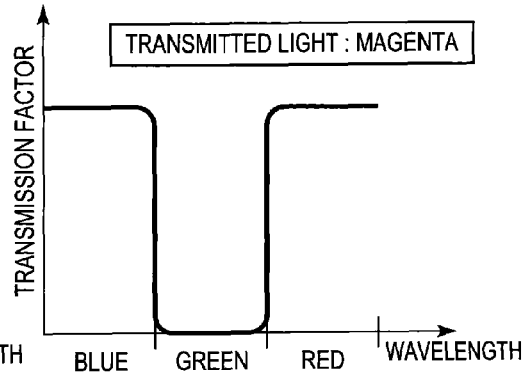
Figure 6B:
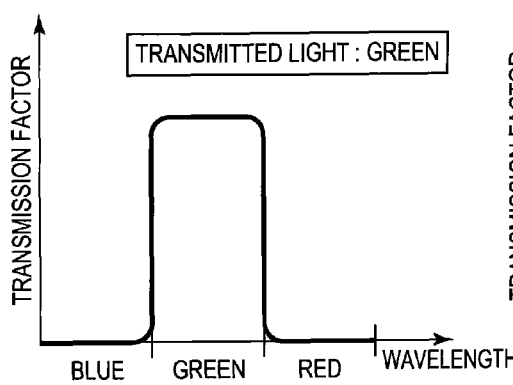
Figure 6E:
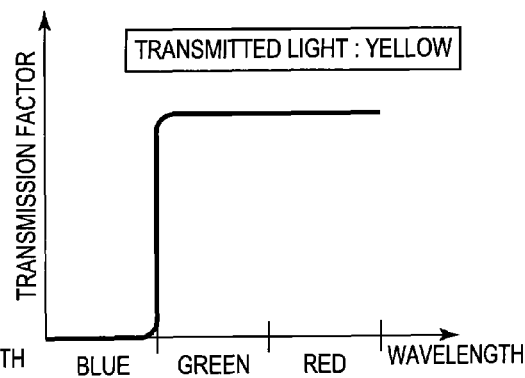
Figure 6C:
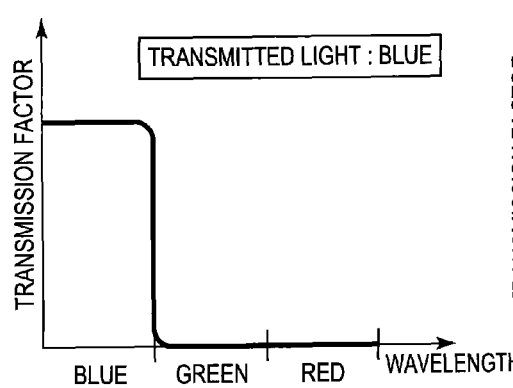
Figure 6F:
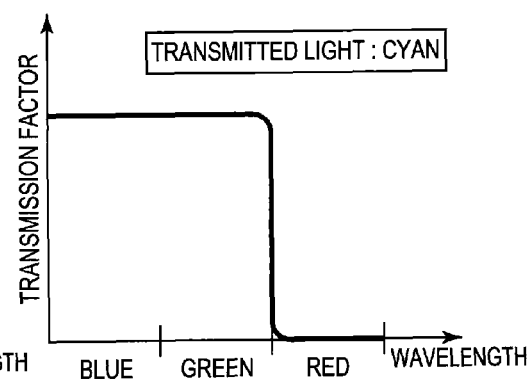

Similarly, as is shown in FIG. 6D, a filter to which a dichroic coating which transmits only light of a wavelength band of magenta is applied transmits only light of the blue and red wavelength bands and cuts off or reflects light of the green wavelength band. In addition, as is shown in FIG. 6E, a filter to which a dichroic coating which transmits only light of a wavelength band of yellow transmits only light of the green and red wavelength bands and cuts off or reflects light of the blue wavelength band. Further, as is shown in FIG. 6F, a filter to which a dichroic coating which transmits only light of a wavelength band of cyan is applied transmits only light of the blue and green wavelength bands and cuts off or reflects light of the red wavelength band.

Consequently, a portion where a dichroic coating which transmits light of wavelength bands of complementary colors is applied to only the light incident surface transmits light of the wavelength bands of the complementary colors. In addition, a portion where the dichroic coating which transmits only light of the wavelength bands of the complementary colors is applied to the light incident surface and a dichroic coating which transmits only light of wavelength bands of primary colors which are included in the wavelength bands of the complementary colors is applied to the light emergent surface which is a back surface of the light incident surface cuts off or reflects part of light of a wavelength band which is included in the wavelength bands of the complementary colors due to the dichroic coating which transmits only light of the wavelength bands of the primary colors and hence transmits only light of the wavelength bands of the primary colors.

Namely, in the embodiment, as is shown in FIGS. 5A and 5B, by applying the dichroic coating which transmits only light of the wavelength band of magenta to the light incident surface of the first filter piece 130 and the dichroic coating which transmits only light of the wavelength band of red to the portion lying at the one side of the light emergent surface thereof, at the portion where the dichroic coating is applied to only the light incident surface, light of the wavelength bands of blue and red which is light of the wavelength band of magenta is allowed to pass therethrough. In addition, at the portion where the dichroic coatings are applied to both the light incident surface and the light emergent surface, light of the wavelength band of green is cut off or reflected on the light incident surface, and light of the wavelength band of blue is cut off or reflected on the light emergent surface. As a result, only light of the wavelength band of red is allowed to pass through the first filter piece 130.

In this way, the first filter piece 130 which configures one segment area of the color wheel 71 is divided into the portion which transmits light of the wavelength band of magenta from the light emergent surface and the portion which transmits light of the wavelength band of red. Similarly, the second filter piece 131 which configures another segment area is divided into two portions which transmit light of the wavelength band of yellow and light of the wavelength band of green, respectively. Then, the third filter 132 which configures the other segment area is divided into two portions which transmit light of the wavelength band of cyan and light of the wavelength band of blue, respectively.

By adopting this configuration, the three filter pieces which make up the segment areas each having the complementary color dichroic filter on one side and the primary color dichroic filter on the other side coating can form the color wheel 71 which can transmit light of the wavelength bands of the six colors.

In addition, various modes can be adopted for combinations of the dichroic coatings applied to the light incident surface and the light emergent surface. For example, the invention is not limited to a combination example (1) shown in FIG. 7 which represents the mode described above. For example, as is shown in a combination example (2), the dichroic coating which transmits only light of the wavelength band of magenta is applied to the whole light incident surface of the first filter piece 130, while the dichroic coating which transmits only light of the wavelength band of blue is applied to the portion lying at the one side of the light emergent surface thereof, the dichroic coating which transmits only light of the wavelength of yellow is applied to the whole light incident surface of the second filter piece 131, while the dichroic coating which transmits only light of the wavelength band of red is applied to the portion at the one side of the light emergent surface thereof, and the dichroic coating which transmits only light of the wavelength band of cyan is applied to the whole light incident surface of the third filter piece 132, while the dichroic coating which transmits only light of the wavelength band of green is applied to the portion lying at the one side of the light emergent surface thereof. By adopting this configuration, the color wheel 71 can also be made into a color wheel which can transmit light of the wavelength bands of the six colors.

In addition, as is shown in combination examples (3), (4), a dichroic coating which transmits only light of the wavelength band of one of the complementary colors is applied to the whole light incident surface of each of the filter pieces, while a dichroic coating which transmits only light of the wavelength band of a different complementary color from the complementary color above is applied to the portion lying at one side of the light emergent surface thereof, whereby the color wheel 71 can be made into a color wheel which can transmit light of the wavelength bands of the six colors by the three filter pieces.

Specifically, as is shown in the combination example (3), the dichroic coating which transmits only light of the wavelength band of magenta is applied to the whole light incident surface of the first filter piece 130, while the dichroic coating which transmits only light of the wavelength band of yellow is applied to the portion lying at one side of the light emergent surface thereof, the dichroic coating which transmits only light of the wavelength band of yellow is applied to the whole light incident surface of the second filter piece, while the dichroic coating which transmits only light of the wavelength band of cyan is applied to the portion lying at one side of the light emergent surface thereof, and the dichroic coating which transmits only light of the wavelength band of cyan is applied to the whole light incident surface of the third filter piece 132, while the dichroic coating which transmits only light of the wavelength band of magenta is applied to the portion lying at one side of the light emergent surface thereof, whereby the color wheel 71 can be made into a color wheel which can transmit light of the wavelength bands of the six colors by the three filter pieces.

Additionally, as is shown in the combination example 4, the dichroic coating which transmits only light of the wavelength band of magenta is applied to the whole light incident surface of the first filter piece 130, while the dichroic coating which transmits only light of the wavelength band of cyan is applied to the portion lying at one side of the light emergent surface thereof, the dichroic coating which transmits only light of the wavelength band of yellow is applied to the whole light incident surface of the second filter piece, while the dichroic coating which transmits only light of the wavelength band of magenta is applied to the portion lying at one side of the light emergent surface thereof, and the dichroic coating which transmits only light of the wavelength band of cyan is applied to the whole light incident surface of the third filter piece 132, while the dichroic coating which transmits only light of the wavelength band of yellow is applied to the portion lying at one side of the light emergent surface thereof, whereby the color wheel 71 can be made into a color wheel which can transmit light of the wavelength bands of the six colors by the three filter pieces.

In addition, although in the first to third filter pieces 130 to 131 shown in FIG. 5B, a center angle is referred to as 120 degrees, a center angle of the primary color transmitting portion is referred to as 80 degrees, and a center angle of the complementary color transmitting portion is referred to as 40 degrees, as to the extents of the primary color and the complementary color, the area ratio of the primary color to the complementary color is not limited to 2:1.

Note that the dichroic coatings may be applied to the light incident surfaces and the light emergent surfaces in opposite ways to those described above. In addition, the first to third filter pieces 130 to 132 shown in FIGS. 5A, 5B do not specify the arrangement of the filter pieces on the color wheel 71 to the arrangement shown therein. Namely, in the color wheel 71 shown in FIG. 5A, the first filter piece 130, the second filter piece 131 and the third filter piece 132 are disposed counterclockwise in that order so as to form the disk shape, the first filter piece 130, the second filter piece 131 and the third filter piece 132 may be disposed clockwise in that order. In addition, the dichroic coatings which are applied to the light emergent surfaces may be applied to either of portions lying at the left- and right-hand sides thereof.

Further, the dichroic coating is not applied to the whole light emergent surface of one or two of the first to third filter pieces 130 to 132, or the dichroic coating is applied to the whole light emergent surface of one or two of the first to third filter pieces 130 to 132, whereby transmitted light of four or five colors may be formed by the three filter pieces.

In addition, on at least one filter piece of the first to third filter pieces 130 to 132 which configure the three segment areas of the color wheel 71, a portion to which the dichroic coating is not applied to both the light incident surface and the light emergent surface which is the back surface of the light incident surface is formed as a colorless filter portion, whereby the color wheel 71 can be made into a color wheel which can transmit seven colors including a clear color (white) by the three filter pieces (see FIGS. 8 and 10).

Additionally, the dichroic coating which transmits light of the wavelength band of magenta, which is the complementary color, is not applied to the whole light incident surface of one or two of the first to third filter pieces 130 to 132 of the color wheel 71, while the dichroic coating is applied to the whole of or portion lying at the one side of the light emergent surface which is the back side of the filter piece, whereby transmitted light of the four to six colors can be formed without creating light of the wavelength band or bands of one or two of the complementary colors.

For example, among the first to third filter pieces 130 to 132 shown in FIG. 5A, the dichroic coating which transmits only light of the wavelength band of magenta is not applied to the light incident surface of the first filter piece 130, the dichroic coatings which transmit only light of the wavelength bands of yellow and cyan, respectively, are applied to the light incident surfaces of the second and third filter pieces 131, 132, and, as is shown in FIG. 5B, the dichroic coatings which transmit only light of the wavelength bands of red, green and blue, respectively, are applied to the portions lying at one sides of the light emergent surfaces of the first to third filter pieces 130 to 132, whereby transmitted light of red, green, blue, yellow, cyan and clear (white) can be formed.

In addition, the dichroic coatings which transmit only light of the wavelength bands of magenta and cyan are not applied to the light incident surfaces of the first and third filter pieces 130, 132, the dichroic coating which transmits only light of the wavelength band of yellow is applied to the incident surface of the second filter 131, and similar to the case described above, the dichroic coatings which transmit only light of the wavelength bands of red, green and blue, respectively, are applied to the portions lying at one sides of the light emergent surfaces of the first to third filter pieces 130 to 132, whereby transmitted light of red, green, blue, yellow, and clear (white) can be formed.

Further, by applying the dichroic coatings which transmit only light of the wavelength bands of the primary colors to the whole light emergent surfaces which are the back sides of the filter pieces to which the dichroic coatings are not applied which transmit only light of the wavelength bands of complementary colors, transmitted light of red, green, blue, yellow and cyan or transmitted light of red, green, blue and yellow can be formed.

Furthermore, by providing a segment area which is made into a colorless filter piece to which no dichroic coating is applied as a further filter piece which is separate from the first to third filter pieces 130 to 132 which are three segment areas to which the dichroic coatings are applied in addition thereto, the color wheel 71 can be made into a color wheel which can transmit light of the wavelength bands of the seven colors including the clear color (white) by the four filter pieces (see FIGS. 9 and 11).

In this way, in the each segment area which constitutes the color wheel 71, the coating which transmits light of the wavelength band of the complementary color is applied to one side, while the coating which transmits light of the wavelength band of the primary color is applied to part of the other side, whereby the increase in color reproduction characteristics can be realized by increasing the luminance without increasing the number of components involved. By adopting this configuration, the increase in working manhours and production costs can be suppressed which would otherwise occur in association with the increase in color reproduction performance. Additionally, the filter pieces can be fixed strongly and rigidly to the rotational shaft of the color wheel in such a way as to withstand high-speed rotations.

In addition, in each segment area which constitutes the color wheel 71, also when the coating which transmits light of the wavelength band of the complementary color is applied to one side and the coating which transmits light of the wavelength band of the different complementary color is applied to the part of the other side, the similar advantage to that described above can be provided.

Further, since by the provision of the color wheel 71 that is configured as has been described heretofore, the respective optical system units do not have to be disposed in any particular arrangement or any particular unit has to be additionally provided in order to increase the color reproduction characteristics, the projector 10 can be provided in which the arrangement of the respective optical system units can be made simple and which can suppress the increase in production costs which would otherwise be the case in association with the increase in color reproduction characteristics.

Furthermore, the invention is not limited to the embodiment that has been described heretofore and, hence, can be modified and/or improved freely without departing from the spirit and scope of the invention.

What is claimed is:

1. A color wheel comprising a plurality of segment areas, wherein the plurality of segment areas include:
   a segment area in which a coating for transmitting light of a wavelength band of magenta is applied to one side of the segment area, a coating for transmitting light of a wavelength band of red is applied to one part of the other side, and a coating for preventing reflection is applied to the other part of the other side;
   a segment area in which a coating for transmitting light of a wavelength band of yellow is applied to one side of the segment area, a coating for transmitting light of a wavelength band of green is applied to one part of the other side, and a coating for preventing reflection is applied to the other part of the other side; and a segment area in which a coating for transmitting light of a wavelength band of cyan is applied to one side of the segment area, a coating for transmitting light of a wavelength band of blue is applied to one part of the other side, and a coating for preventing reflection is applied to the other part of the other side.

2. A color wheel as set forth in claim 1, wherein, in addition to the three segment areas to which the coatings are applied, a segment area is provided which is made into a colorless filter to which no color coating is applied.

3. A projector including a light source unit for emitting white light, a color wheel, a display device, a cooling fan, a light source side optical system for guiding light from the light source unit to the display device, a projection side optical system for projecting an image emitted from the display device onto a screen, and a projector control unit for controlling the light source unit and the display device, wherein the color wheel is the color wheel set forth in claim 1.

4. A color wheel comprising a plurality of segment areas, wherein the plurality of segment areas include:

a segment area in which a coating for transmitting light of a wavelength band of magenta is applied to one side of the segment area, a coating for transmitting light of a wavelength band of blue is applied to one part of the other side, and a coating for preventing reflection is applied to the other part of the other side;

a segment area in which a coating for transmitting light of a wavelength band of yellow is applied to one side of the segment area, a coating for transmitting light of a wavelength band of red is applied to one part of the other side, and a coating for preventing reflection is applied to the other part of the other side; and a segment area in which a coating for transmitting light of a wavelength band of cyan is applied to one side of the segment area, a coating for transmitting light of a wavelength band of green is applied to one part of the other side, and a coating for preventing reflection is applied to the other part of the other side.

5. A color wheel as set forth in claim 4, wherein, in addition to the three segment areas to which the coatings are applied, a segment area is provided which is made into a colorless filter to which no color coating is applied.

6. A projector including a light source unit for emitting white light, a color wheel, a display device, a cooling fan, a light source side optical system for guiding light from the light source unit to the display device, a projection side optical system for projecting an image emitted from the display device onto a screen, and a projector control unit for controlling the light source unit and the display device, wherein the color wheel is the color wheel set forth in claim 4.

* * * * *